(12) United States Patent
Tozawa et al.

(10) Patent No.: US 7,835,952 B2
(45) Date of Patent: Nov. 16, 2010

(54) SYSTEM, METHOD, AND COMPUTER PROGRAM PRODUCT FOR CREATING A PRODUCTION PLAN

(75) Inventors: Yoshio Tozawa, Tokyo-to (JP); Hidefumi Watanuki, Kwasaki (JP)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 10/436,908

(22) Filed: May 13, 2003

(65) Prior Publication Data
US 2003/0233295 A1 Dec. 18, 2003

(30) Foreign Application Priority Data
May 17, 2002 (JP) ............... 2002-142590

(51) Int. Cl.
G06Q 10/00 (2006.01)
G05B 19/418 (2006.01)
G06F 9/46 (2006.01)
G06F 15/02 (2006.01)
G06F 19/00 (2006.01)
G06G 1/14 (2006.01)
G06Q 20/00 (2006.01)

(52) U.S. Cl. .................. 705/28; 705/1; 705/8; 705/9; 705/22; 700/95; 700/100; 700/104; 700/106

(58) Field of Classification Search .............. 705/28, 705/1, 8, 9, 22; 700/95, 100, 104, 106; 364/468, 364/469
See application file for complete search history.

(56) References Cited

U.S. PATENT DOCUMENTS

| | | | | |
|---|---|---|---|---|
| 4,958,292 A | * | 9/1990 | Kaneko et al. | 705/29 |
| 5,204,821 A | * | 4/1993 | Inui et al. | 705/29 |
| 5,231,567 A | * | 7/1993 | Matoba et al. | 700/100 |
| 5,720,157 A | * | 2/1998 | Ross | 53/445 |
| 5,841,659 A | * | 11/1998 | Tanaka et al. | 700/121 |
| 5,913,200 A | * | 6/1999 | Wakiyama | 705/8 |
| 5,946,663 A | * | 8/1999 | Tanaka et al. | 705/8 |
| 6,151,582 A | * | 11/2000 | Huang et al. | 705/8 |
| 6,321,132 B1 | * | 11/2001 | Dawande et al. | 700/97 |
| 6,415,196 B1 | * | 7/2002 | Crampton et al. | 700/100 |
| 6,591,153 B2 | * | 7/2003 | Crampton et al. | 705/8 |
| 7,444,294 B2 | * | 10/2008 | Nomoto et al. | 705/7 |
| 2002/0082893 A1 | * | 6/2002 | Barts et al. | 705/8 |
| 2002/0107600 A1 | * | 8/2002 | Crampton et al. | 700/100 |

(Continued)

FOREIGN PATENT DOCUMENTS

JP  PUPA 05-174030  7/1993

(Continued)

*Primary Examiner*—Matthew S Gart
*Assistant Examiner*—Ig T An
(74) *Attorney, Agent, or Firm*—Law Office of Peter G. Korytnyk, PLLC

(57) ABSTRACT

In a build-to-order (BTO) management system, domestic production orders are incorporated into a production plan before overseas production orders. When incorporating the production orders into the production plan, an ideal number of products is set for various equalizing factors, and several kinds of the production plans are made on the basis of an achievement ratio of the number of products for the equalizing factors actually incorporated into the production plan to the ideal production number of products and the dates of receiving the production orders. The resulting production plans are compared to choose an optimal production plan.

1 Claim, 6 Drawing Sheets

U.S. PATENT DOCUMENTS

| | | | |
|---|---|---|---|
| 2003/0050817 A1* | 3/2003 | Cargille et al. | 705/8 |
| 2003/0088450 A1* | 5/2003 | Chiu et al. | 705/8 |
| 2003/0126005 A1* | 7/2003 | Liao et al. | 705/10 |
| 2003/0200150 A1* | 10/2003 | Westcott et al. | 705/26 |
| 2003/0208389 A1* | 11/2003 | Kurihara et al. | 705/7 |
| 2004/0039597 A1* | 2/2004 | Barts et al. | 705/1 |
| 2004/0054554 A1* | 3/2004 | Barts et al. | 705/1 |
| 2004/0073448 A1* | 4/2004 | Barts et al. | 705/1 |
| 2004/0107111 A1* | 6/2004 | Barts et al. | 705/1 |
| 2005/0288986 A1* | 12/2005 | Barts et al. | 705/9 |
| 2007/0078696 A1* | 4/2007 | Hardin, Jr. | 705/8 |

FOREIGN PATENT DOCUMENTS

| | | |
|---|---|---|
| JP | PUPA 9-120424 | 5/1997 |
| JP | PUPA 10-138102 | 5/1998 |
| JP | PUPA 10-166247 | 6/1998 |
| JP | 2000-288875 | 10/2000 |
| JP | 2001-202121 | 7/2001 |
| JP | PUPA 2001-202121 | 7/2001 |
| WO | WO 02/010872 | 2/2002 |

* cited by examiner

FIG. 3
FIG. 3A
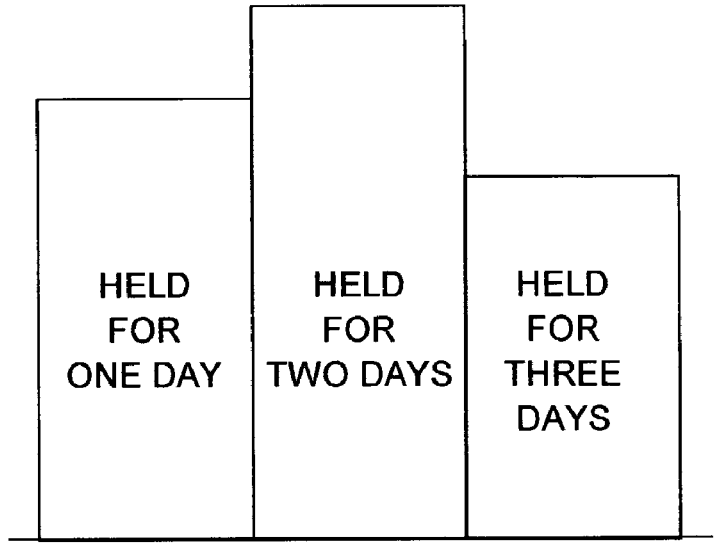
FIG. 3B
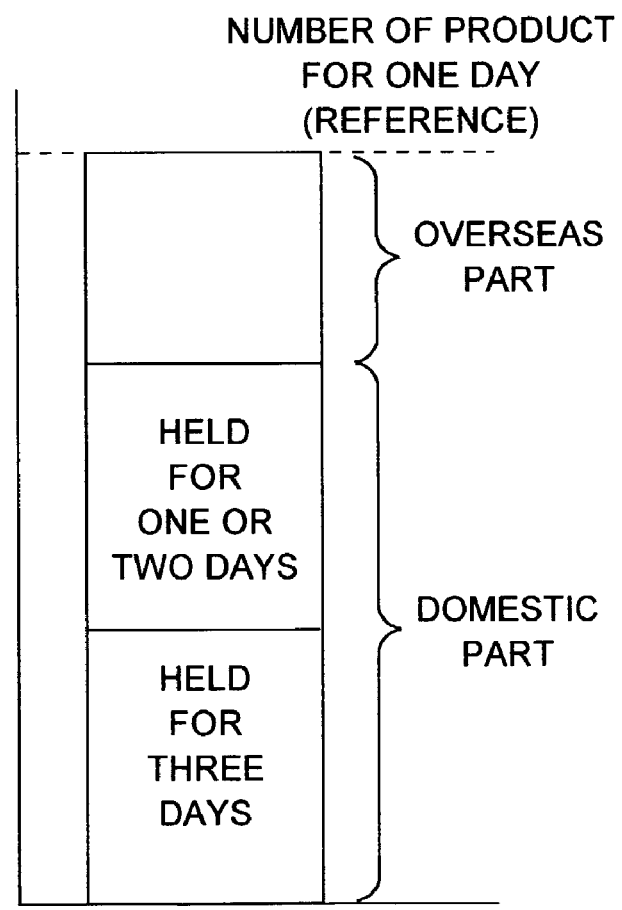

FIG. 5

| ORDERS | EQUALIZING FACTOR A (TYPE OF CAR) | EQUALIZING FACTOR B (A/T) | EQUALIZING FACTOR C (SUN ROOF) | EQUALIZING FACTOR D (ABS) | EQUALIZING FACTOR E (AIR BAG) |
|---|---|---|---|---|---|
| ORDER 04020011 | MODEL F5-DW | ○ |  | ○ |  |
| ORDER 04020012 | MODEL F5-DW |  | ○ | ○ |  |
| ORDER 04020013 | MODEL BA-3C | ○ |  | ○ |  |
| ORDER 04020014 | MODEL XB-BP |  |  | ○ | ○ |
| ORDER 04020015 | MODEL BA-3C | ○ |  | ○ | ○ |
| ORDER 04030021 | MODEL CD-4E |  |  |  |  |
| ORDER 04030022 | MODEL F5-DW | ○ | ○ |  | ○ |
| ORDER 04030023 | MODEL HJ-7U |  |  | ○ | ○ |
| ORDER 04030024 | MODEL XB-BP |  |  |  |  |
| ORDER 04030025 | MODEL F5-DW |  | ○ | ○ | ○ |
| ORDER 04030026 | MODEL XB-BP | ○ | ○ |  |  |

SYSTEM, METHOD, AND COMPUTER PROGRAM PRODUCT FOR CREATING A PRODUCTION PLAN

FIELD OF THE INVENTION

The present invention relates to a system and method for creating a production plan for products built to order.

BACKGROUND

As is well known in the art, a car, for example, may be ordered by a car dealer after a customer has provided specifications such as a model type, a body color, some options to be installed, and so on.

As shown in FIG. 6, when the car is ordered the dealer may check the state of its stock or inventory. If a car is not in stock that has the specifications desired by the customer, the dealer may place an order with the manufacturer on behalf of the customer, and advise the customer of an expected delivery date based on the manufacturer's production plans.

The manufacturer may develop a monthly production plan in accordance with a marketing target determined on the basis of various information. At a finer level of detail, a daily production plan may also be set up. Typically, these production plans are not based on the orders received from customers; rather, they are speculative.

On a typical production line, cars having many different kinds of specifications may be manufactured in sequence. Depending on the options selected, some cars take longer than others to assemble. When cars requiring above-average assembly time are assembled back-to-back on the line, congestion and excess worker loads may result.

Accordingly, the above mentioned daily production plans generally attempt to smooth variations in production time and workloads, for example based on a rule that certain types of cars requiring above-average assembly times be scheduled as every N-th car in the assembly line rather than back-to-back.

Unfortunately, this approach has significant drawbacks, as follows.

First, a problem arises that both the manufacturer and the dealer need to keep a certain level of stock, which is often quite uneconomical.

Also, production plans as described above are difficult and expensive to create, and sometimes require a certain kind of intuition in view of the various skills and capabilities of the workers who actually assemble the cars. For the latter reason such plans are not readily amenable to creation by computer program.

Nevertheless, there has been a recent increase in customer interest in ordering cars rather than accepting cars from dealer stock.

In prior production systems, tailoring a customized car to a customer's specification may disrupt the monthly or daily production plans. For the reasons mentioned above, however, it is difficult to change production plans once they are set. As a result, economic inefficiencies arise, and a customer who orders a built-to-order (BTO) car must wait an undesirably long time for the order to be filled. Thus the production of built-to-order cars is, by some measures, nearly impractical.

SUMMARY

The present invention provides a system, method, and computer program product for creating a production plan efficiently, so that built-to-order products may be manufactured in a timely way in response to specifications provided by a customer.

A production plan creation system according to the present invention stores data of a first production order information group in a first order information storage means, and data of a second production order information group in a second order information storage means for which the appointed term of delivery is longer than that for the first production order information group. Further, a production plan creation means can create data of a production plan for a product by incorporating thereinto a production order selected from the second production order information group after incorporating thereinto a production order selected from the first production order information group.

Plural specification information is stored in association with individual production orders forming the first production order information group in the first order information storage means. The production plan creation means selects, from the plural specification information, specification information satisfying a predetermined selection condition, and selects from the first production order information group a production order having the selected specification information to incorporate into the production plan.

Two or more production plans may be created in the production plan creation means by a production order selected from the first production order information group on the basis of the specification information which is selected in accordance with each of two or more kinds of selection conditions. In this case, it is possible to select, from two or more production plans, a production plan satisfying a predetermined condition.

Load information concerning a load in a production process may be stored in the order information storage means in association with individual production order. A production plan may be selected in accordance with the load information of a production order incorporated into the two or more production plans created.

Further, according to the invention it is possible in the production plan creation means to preferentially incorporate into the production plan any production orders that arrive within a term previously set up in the first production order information group.

Also, plural specification information may be associated with an individual production order stored in the second order information store means which forms the second production order information group. It is possible in the production plan creation means to select specification information satisfying a predetermined selection condition in the plural specification information, to incorporate into the production plan, and to select from the second production order information group a production order which has the specification information to incorporate into the production plan.

The present invention includes a production plan creation system comprising an order information storage section for storing plural order information including information concerning options to be attached to an individual product, an order information selection section for selecting specific order information on the basis of the information concerning the options, and a production plan creation section for incorporating the selected order information into the production plan. At this time, the order information selection section sets up an ideal ratio of products for each option to the number of products to be produced in a predetermined term. Then, specific order information to be subsequently incorporated into the production plan is selected in accordance with the ratio of products and the number of products which have been completed in incorporating the order information into the production plan.

Further, the present invention includes a production plan creation system which comprises an order information storage section for storing two order information groups having different appointed terms of delivery, an order information selection section for selecting order informations from the two order information groups on the basis of a load in a production process, and a production plan creation section for creating data of a production plan by incorporating, into the production plan, order information selected from the order information groups having a longer appointed term of delivery after incorporating into the production plan order information selected from the order information groups having a shorter appointed term of delivery.

The present invention includes a method of creating a production plan for products in a computer system. This method comprises a step (a) of selecting specific order information from an order information group associated with orders for plural products on the basis of an individual product specification, and a step (b) of incorporating the selected order information into a production plan.

In step (a), it is possible to use information on the option attached to the product as information for judging the product specification. Further, in the step (a), it is possible to set up an ideal ratio of products for each option to the number of the products to be produced in a predetermined period, and to extract specific order information from the order information group on the basis of the number of products for which order information has been incorporated into the production plan in step (b) and the ratio.

Further, it is preferable that the selection of specific order information from an order information group in step (a) is performed each time the order information for one product is incorporated into the production plan in step (b).

Moreover, it is preferable that the method further comprises a step (c) of incorporating, into the production plan, order information that arrives within a term set up for order information of the individual product.

Further, the invention may further comprise a step (d) of incorporating, into the production plan, order information selected from an order information group for the products having a longer appointed term of delivery than that for the order information group dealt with the steps (a) and (b), after order information for a predetermined number of products is incorporated into the product plan by performing steps (a) and (b).

The production plan creation method of the present invention may be characterized by selecting order information of products on the basis of a load in a production process from two order information groups stored in a database having different appointed terms of delivery, and creating data of a production plan by incorporating, into the production plan, order information selected from one of the two order information groups having a longer appointed term of delivery, after incorporating, into the production plan, order information selected from another of the two order information groups having a shorter appointed term of delivery.

The invention also includes a computer program product for executing, on a computer system, a step (a) of selecting specific order information from an order information group associated with plural production orders on the basis of options to be attached to an individual product, and a step (b) of incorporating the selected order information into a production plan. At this time, in the step (a), an ideal ratio of products may be set up for each option to the number of products to be produced for a predetermined period, and in the step (b), specific order information is selected from the order information group on the basis of the number of products which have been completed in incorporating the order information into the production plan and the ratio.

The present invention also includes a computer system for executing processes of selecting order information for a product from an order information group in association with plural orders for products stored in a database, on the basis of a load in a production process for the product, and a process of creating data of a production plan by incorporating the selected order information thereinto.

At this time, in the process of selecting order information, it is possible to use information about product options for judging a load in the production process.

Also, in the process of selecting order information, it is preferable for the computer system to further execute a process of selecting an optimal production plan by comparing a plurality of created production plans to each other, since it is possible to create plural kinds of production plans in the process of creating the production plans by changing the bases for selecting order information.

BRIEF DESCRIPTION OF THE DRAWINGS

FIG. 3 is a diagram schematically illustrating a flow of creating the production plan.

FIG. 5 is a diagram showing an example of the list of production orders used when the production plan is created.

DETAILED DESCRIPTION

The present invention will be described in detail with respect to a preferred embodiment thereof shown in the accompanying drawings.

Figure 1:
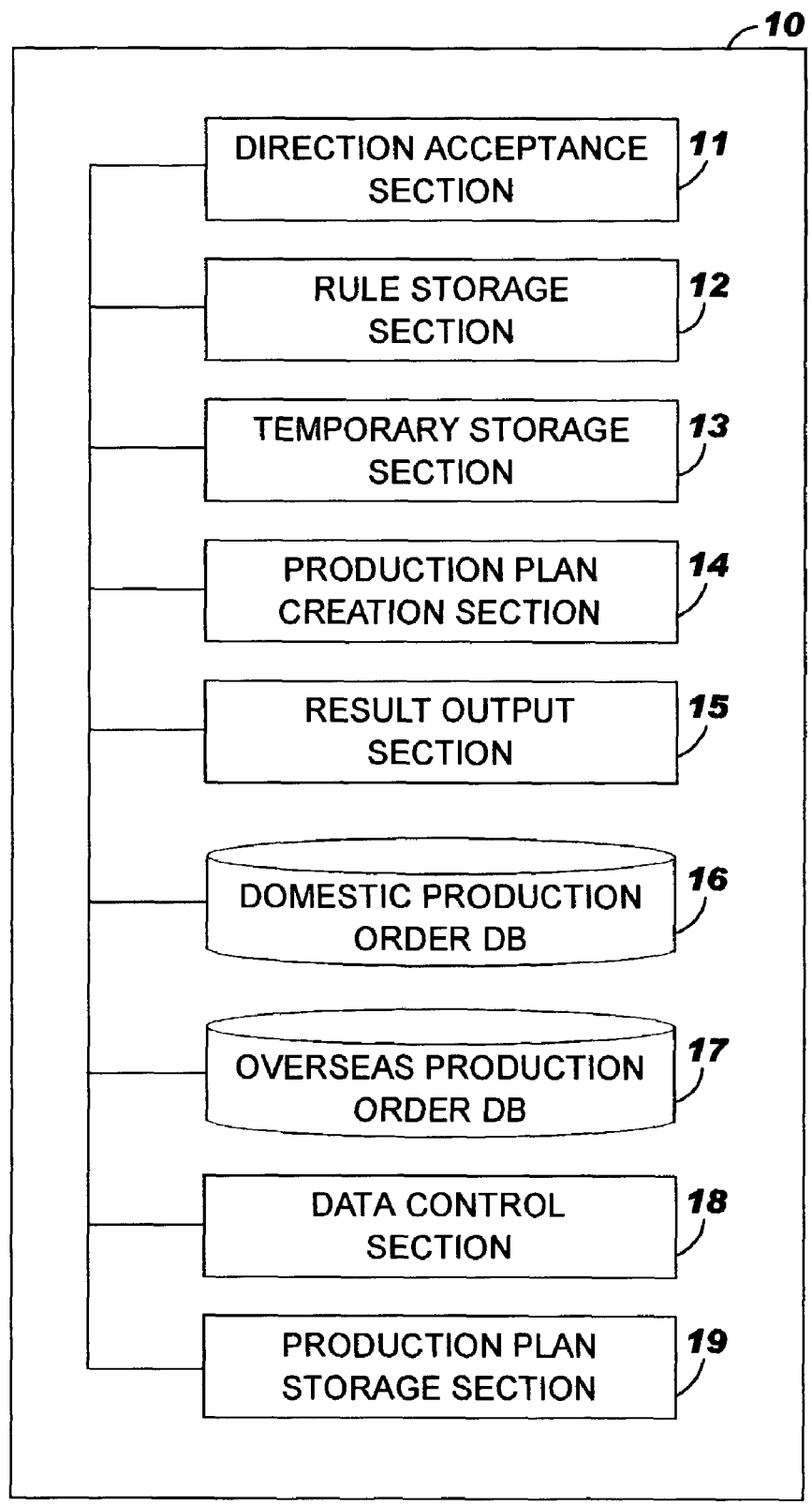
FIG. 1 is a diagram showing a computer system to which the present invention may be applied.

FIG. 1 is a diagram showing a configuration of a build-to-order (BTO) management system according to the present invention. The BTO management system (or production plan creation system) 10 shown in FIG. 1 has a function of creating a daily production plan on the basis of production orders for cars which have been input from terminals of domestic and overseas dealer network sites through networks such as WANs (Wide Area Networks) or the like.

The BTO management system 10 is provided with a direction acceptance section 11 for accepting a direction input from the outside by operators, a rule storage section 12 for storing various rules mainly in accordance with conditions of a production line for creating a production plan, a temporary storage section 13 for temporarily storing data or the like used in creating the production plan, a production plan creation section (production plan creation means) 14 for creating the production plan, a result output section 15 for outputting to the outside the production plan made in the production plan creation section 14, a domestic production order database (DB) (a first order information storage means, data base, order information storage section) 16 for storing data of production order groups (a first production order information group, order information group) received from terminals (not shown) of the domestic dealer network, an overseas production order database (DB) (a second order information storage means, data base, order information storage section) 17 for storing data of production order groups (a second production order information group, order information group) received from terminals (not shown) of the overseas dealer network, a data control section (order information selection section) 18 for controlling the input/output operations for the domestic production order DB 16 and the overseas production order DB 17, and a production plan storage section 19 for storing the production plan made in the production plan creation section 14.

Such a BTO management system 10 can be realized by a stand-alone computer device such as a personal computer (PC) or workstation, or by a computer system comprising a plurality of computer devices interconnected by a network.

In these configurations, the direction acceptance section 11, the production plan creation section 14, and the result output section 15 may be implemented by a CPU (not shown) executing processes based on a processing program previously installed in the computer device. Also, the rule storage section 12 may be implemented with predetermined data being previously stored in a hard disk drive (HDD, not shown in the drawing) of the computer device, and the temporary storage section 13 may be implemented by causing data to be stored in a main memory (not shown in the drawing) of the computer device. Further, the domestic production order DB 16 and the overseas production order DB 17 may be realized with the HDD (not shown in the drawing) of the computer device or by storing data in some other referable data storage unit. A production plan storage section 19 may be realized by storing, in the HDD (not shown in the drawing) or the like, the production plan created in the production plan creation section 14.

A production order from a domestic terminal whose data has been stored in the domestic production order DB 16 may include information such as the production order received date, the number of days elapsed after the order received date and so on.

An overseas production order which has been stored in the overseas production order DB 17 may be sorted every week, for example, which may be less frequently than the sorting of domestic orders, since overseas production orders would be put together at a key position of the overseas dealer network and then transferred to the BTO management system 10. As to the overseas delivery, after the order is received, the product produced, and the product shipped from the factory, delivery to the overseas dealer consumes a significant period of time, as it involves activities such as loading, overseas transporting, unloading, and so on, and may require processing through customs. Accordingly, overseas deliveries may require a larger buffer capacity for orders than domestic deliveries.

Figure 2:
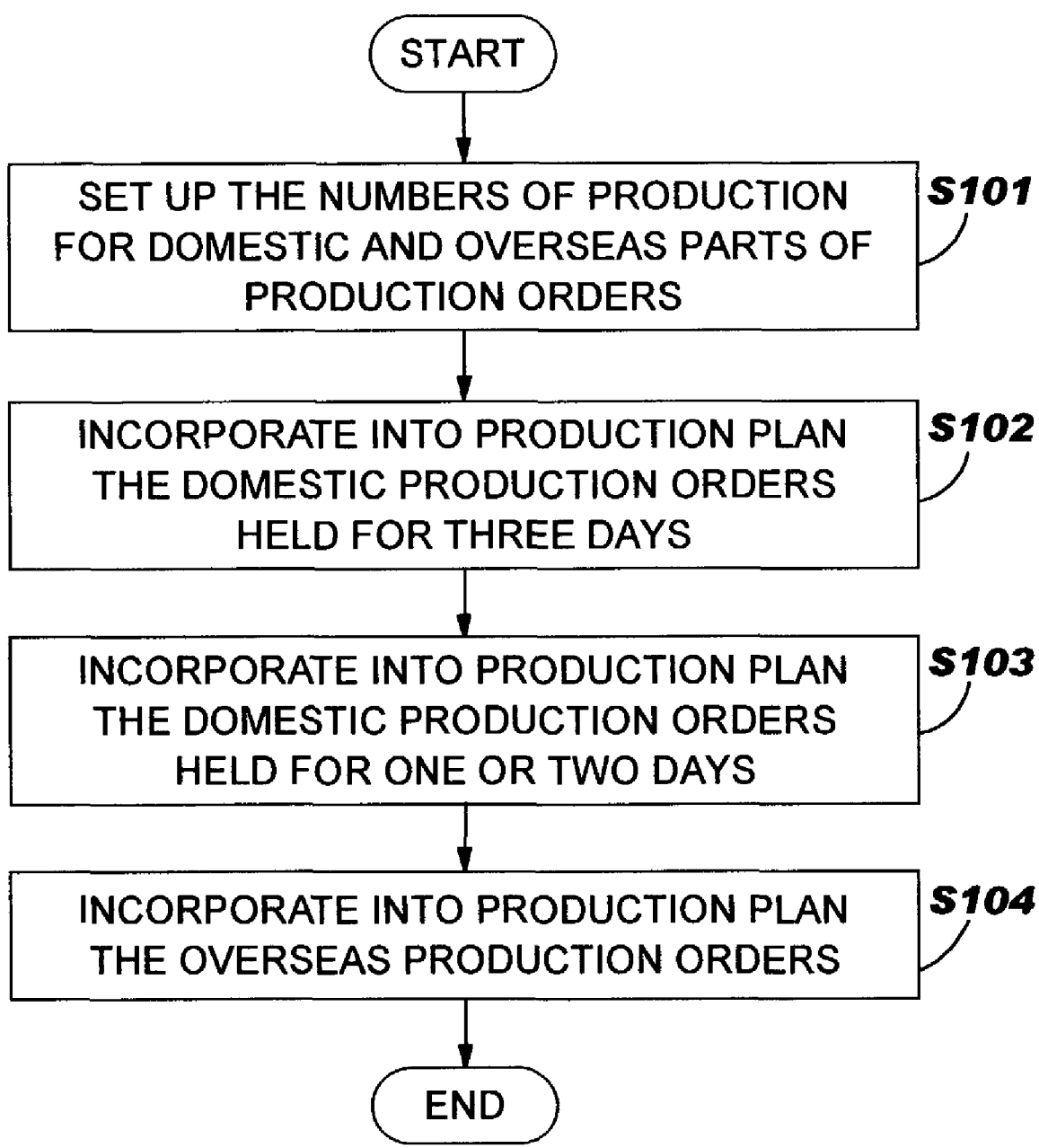
FIG. 2 is a flowchart showing an outline of the process for creating the production plan.

In the production plan creation section 14 of the BTO management system 10 as described above, when a process for creating the production plan is accepted and initiated at the direction acceptance section 11, a process using a previously installed program may be executed automatically to create a production plan for a predefined planned number of products for one day. In this process, as shown in FIG. 2, the number of products to be produced for production orders from domestic dealers (hereinafter, called "domestic part of production orders") and the number of products to be produced for production orders from overseas dealers (hereinafter, called "overseas part of production orders") are set up at first (step S101). These can be estimated, for example, from the number of products previously planned for production in one day, and a ratio of the number of products required to be produced in one day for the domestic part of production orders stored in the domestic production order DB 16, to the number of products required to be produced in one day for the amount of the overseas part of production orders stored in the overseas production order DB 17.

Further, the domestic part of production orders is incorporated into the production plan. As shown in FIGS. 3(*a*) and 3(*b*), at this time, the production plan creation section 14 first incorporates, into the production plan, the production orders from the data stored in the domestic production order DB 16, which production orders have been held therein for the number of days previously defined as the maximum number of holding days (a term or period). In a preferred embodiment, the production orders may be held for three days (step S102). The production plan created by data of the production orders being incorporated thereinto is stored in the production plan storage section 19.

Then, a specific production order is selected on the basis of an algorithm described below from the remaining production data stored in the domestic production order DB 16, i.e., in a preferred embodiment, from the production orders having been held therein for one or two days, and is incorporated into the production plan stored in the production plan storage section 19 by adding it thereto until it reaches the set up number of domestic parts of production orders for one day (step S103). At this time, a plurality of production plans may be created by changing the conditions for selecting, from the domestic production order DB 16, the production orders to be incorporated into the production plan.

After that, in the production plan creation section 14, the various kinds of production plans stored in the production plan storage section 19 are compared with each other to select the optimal production plan for the domestic part of production orders.

Thus, the production plan concerning the domestic part of production orders for one day is created.

In order to create the overseas production plan for one day, according to an algorithm described below in detail, the production plan creation section 14 incorporates the production order, of which data is stored in the overseas production order DB 17, into the production plan stored in the production plan storage section 19 by adding the production orders thereto until it reaches the set up production number of products for the overseas production orders per one day (step S104). Also, at this time, a plurality of production plans may be created by changing the conditions for selecting from the overseas production order DB 17 the production orders to be incorporated into the production plan to select the optimal production plan for the overseas part of production orders.

Thus, as shown in FIG. 3(*b*), the entire production plan for one day may be created.

The entire production plan for one day determined in such a manner is output from the result output section 15 in the form of a printout, or is displayed on a monitor screen, or is output to a terminal on the production line side, or the like.

An algorithm will now be described for performing the above steps S103 and S104 to incorporate, into the production plan, the domestic part of the production orders held therein for one and two days and the overseas part of the production orders, respectively. The description gives an example of incorporating into the production plan the domestic part of production orders held for one and two days. It is also possible, however, to perform the incorporation of the overseas part of the production orders into the production plan by executing similar processes.

Figure 4:
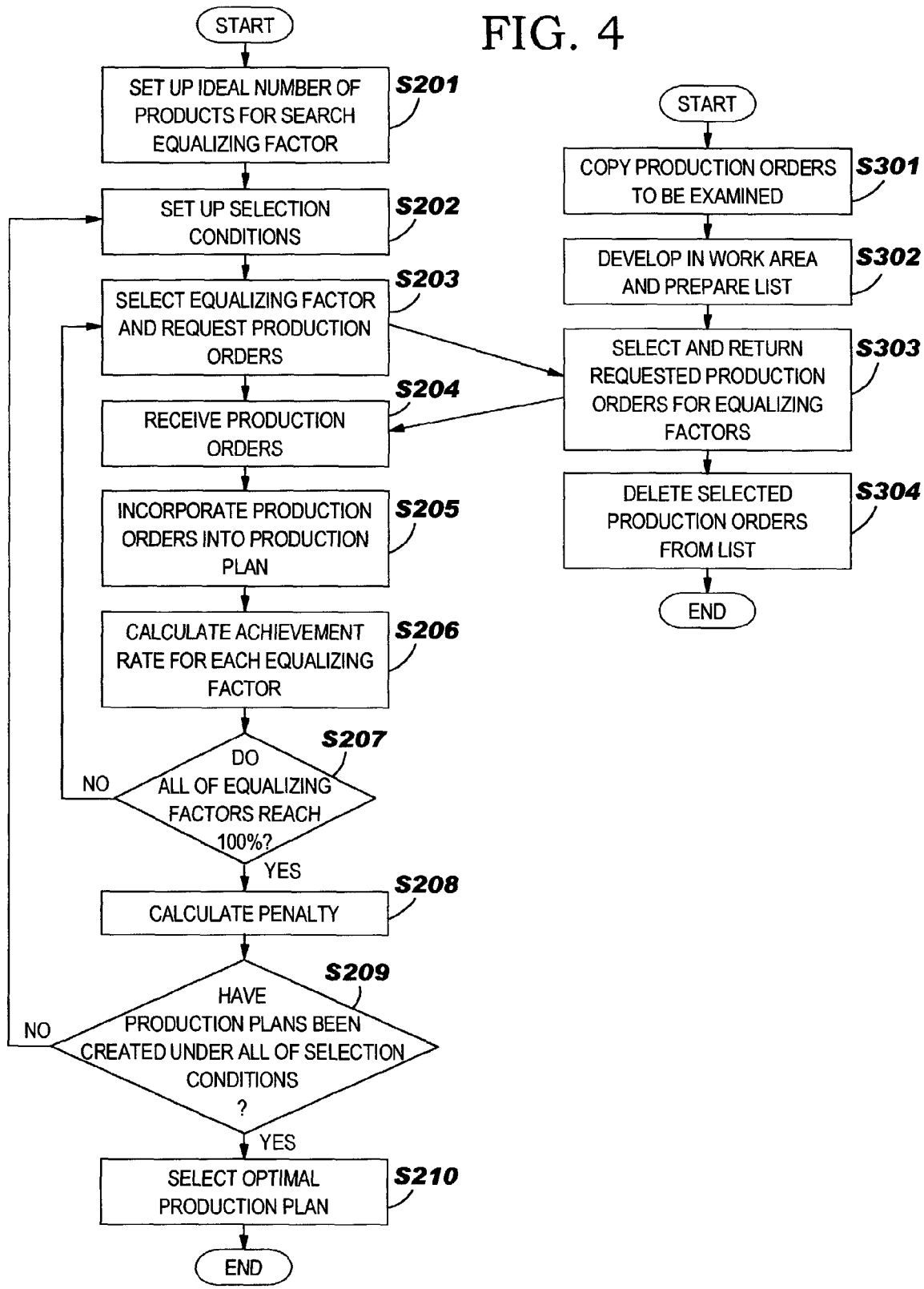
FIG. 4 is a flowchart showing a process for creating plural kinds of production plans.
Figure 6:
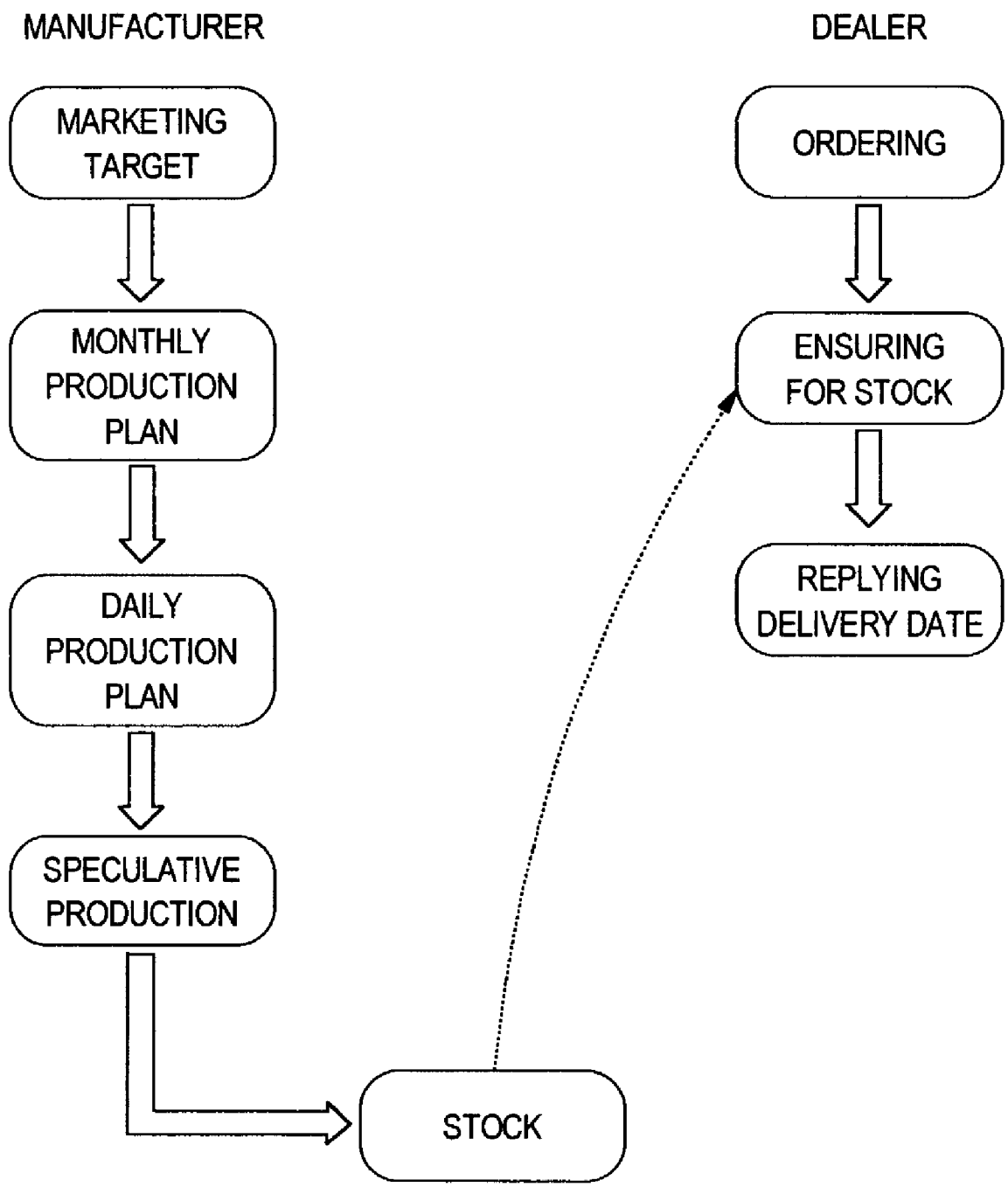
FIG. 6 is a diagram showing a prior method of creating a production plan.

As shown in FIG. 4, in the production plan creation section 14, an ideal number of products to be incorporated into a daily production plan is estimated for each equalizing factor as to the domestic part of production orders, and stored in the temporary storage section 13 (step S201).

The equalizing factor referred to here may be a factor affecting the number of processes taken in assembling cars one by one, depending on types of cars, kinds of options, the presence of options, and so on, when equalization of the number of processes in a production line is attempted. As shown in FIG. 5, in the data of the production orders stored in the domestic production order DB 16 and the overseas production order DB 17, a type of the car, the presence of an automatic transmission (A/T), specification information (load information) such as the presence of an anti-lock brake system (ABS), air-conditioner, sunroof, aero-parts, and so on, are listed as equalizing factors A, B, C, D, E, and so-forth, which may be identified by flagging the production order of individual car.

In the above step S201, an ideal number of products for each day is estimated for each of the equalizing factors A, B, C, D, E, and so forth. This means that the equalizing factor A, for example, can be obtained from the following formula:

$$\text{Ideal number of products} = \\ \text{(the number of products for those provided with the equalizing} \\ \text{factor } A \text{ among the domestic part of production orders)} / \\ \text{(the maximum number of holding days)}.$$

Similar computations follow the same basic algorithm for the other equalizing factors.

The maximum number of holding days is previously set up for the domestic part of the production orders as a maximum number of days of delay from the acceptance of the production order in the BTO management system 10 to its incorporation into the production plan. In a preferred embodiment, the maximum number of holding days is three, for example, which is stored in the rule storage section 12.

In the present embodiment, it is assumed that, for example, the equalizing factor A concerns the type of the car, the equalizing factor B concerns the A/T, the equalizing factor C concerns the sunroof, the equalizing factor D concerns the ABS, and the equalizing factor E concerns the airbag, and further that the number of cars provided with the equalizing factor C, of which data is stored in the domestic production order DB 16, is 150, the number of cars with the equalizing factor D is 450, the number of cars with the equalizing factor E is 600, and the maximum number of holding days for the airbag is 3. In this case, the ideal number of cars for the domestic orders can be obtained, as follows:

Equalizing factor C (sunroof): 150/3=50 products
Equalizing factor D (ABS): 450/3=150 products
Equalizing factor E (airbag): 600/3=200 products Then, in step S103 (or step S104 for the case of overseas production orders), the production plan creation section 14 creates a plurality of production plans by changing the selection conditions through plural sets for selecting the production orders to be incorporated into the production plan. In this process, a first predetermined selection condition is set up at first in the production plan creation section 14 (step S202). For example, an achievement ratio of the number of cars incorporated into the production plan to the ideal number of products for each equalizing factor is estimated and a low number is set up as the selection condition (the lower the number is, the higher the priority).

If it is assumed that, for example, when the production plan for the domestic part of production orders having been held for three days is incorporated into the production plan, decisions are made in step S102 as follows:

Equalizing factor C (sunroof): 20 products
Equalizing factor D (ABS): 120 products
Equalizing factor E (airbag): 190 products the achievement ratio for each ideal number of products obtained in step S101 is then, as follows:

Equalizing factor C (sunroof): 20/50 products=40%
Equalizing factor D (ABS): 120/150 products=80%
Equalizing factor E (airbag): 190/200 products=95%
No equalizing factor: 50/100 products=50%

Then, in the production plan creation section 14, the equalizing factor having the highest priority under the selection conditions set up is selected and the data of the production order for the selected equalizing factor is requested by the data control section 18.

In this example, the lowest achievement ratio of the equalizing factor would have the highest priority, since the low achievement ratio of the number of products incorporated into the production plan to the ideal number of products has been set as the selection condition. That is, the equalizing factor C (sunroof) having the lowest achievement ratio of 40% is selected as an object to be incorporated into the production plan. Then, in the production plan creation section 14, the data for the production order to be incorporated is requested.

Then, in the data control section 18, the production order of one product for the equalizing factor (the equalizing factor C in this example) requested from the domestic production order DB 16 is selected and returned to the production plan creation section 14. At this time, the selecting, the reading out, and so on, of the production order from the domestic production order DB 16 is not necessarily done one by one; rather, the data of the domestic part of production orders which becomes an object to be examined may be previously read out from the domestic production order DB 16 and copied (step S301), and further developed in the temporary storage section 13 to prepare a list as shown in FIG. 5 (step S302).

When a request is received from the production plan creation section 14, a production order for one product provided with the requested equalizing factor is selected from the highest rank of the list (step S303), and subsequently the selected production order is deleted from the list stored in the temporary storage section 13 (step S304).

When data of a production order having the equalizing factor selected in step S203 (the equalizing factor C herein) is received in the production plan creation section 14, the production order is incorporated into the production plan stored in the production plan storage section 19 (steps S204, S205).

After the production order is incorporated in step S205, the achievement ratio for the ideal number of products is calculated again (step S206). At this time, since the incorporated production order may be provided with a plurality of equalizing factors, the achievement ratio may be calculated for each equalizing factor.

If it is assumed, for example, that the production order of "order 04020012" in FIG. 5 would be incorporated into the production plan, this production order would be provided with the equalizing factor C (sunroof) and the equalizing factor D (ABS), so that the achievement ratio of each equalizing factor might be changed, as follows:

equalizing factor C (sunroof): 21 products - - - 42%
equalizing factor D (ABS): 121 products - - - 80.7%

After the achievement rate for each equalizing factor is recalculated, a decision is made as to whether the achievement ratios for all of the equalizing factors have reached 100% or not, or whether they have reached levels corresponding to the production numbers of products for the domestic part of the production orders for one day or not (step S207).

If they have not reached 100%, the operation is returned to step S203 and the above process is repeated until the achievement ratios for all of the equalizing factors reach 100%.

Thus, at the time when the achievement ratios for all of the equalizing factors reach 100%, or when they reach levels corresponding to the production numbers of products for one day for the domestic part of the production orders, the production plan for the domestic orders for one day is created. This plan has, as the highest priority, the selection condition set up in step S202.

Further, in the production plan creation section 14, an evaluation is made of the created production plan for one day on the basis of the equalizing rule stored in the rule storage section 12, specifically, a comparison based on the calculation of a penalty (step S208).

The rule storage section 12 stores a variety of rules for equalizing the production load and usage load of the parts. For example, the rules might be "a specific type of car should not be manufactured successively and should be limited to a ratio of one third or less of the total production volume", "aero-parts that require above-average assembly time should not be scheduled successively," and so on. These rules may be determined experientially depending on processing capability of the production line, parts supply situation, and so on.

Based on the rules stored in the rule storage section 12, the production plan for one day created in step S102 (steps S202-S207) is evaluated. A case may occur wherein a plurality of options may need to be simultaneously attached according to the production order for one product. Thus, an order violating the above rules may be included in the created production plan, for which the degree of violation may be numerically expressed and evaluated. For this purposes, penalty points are set up according to weights of the rules and stored in the rule storage section 12. Based on this operation, the penalty attributable to the created production plan is calculated and stored in the temporary storage section 13.

A decision is made as to whether the production plan corresponding to all of the selection conditions has been created or not (step S209).

If the creation of a production plan for all of the selection conditions has not been completed, the operation is returned to step S202, and a production plan having the other selection conditions as the highest priority is created. For example, the achievement ratio of the number of products incorporated into the production plan to the ideal number of products for each equalizing factor may be calculated so that the highest ratio may have the highest priority, or the earliest production order received may have the highest priority, and so on.

Thus, a plurality of production plans are created by replacing in turn the conditions for selecting the production order to be incorporated into the production plan, and the penalty is calculated for each production plan and stored in the temporary storage section 13.

The production plan having the lowest penalty is selected as the optimal production plan (step S210). Accordingly, a production plan for the domestic part of the production orders for one day is determined.

In step S104, for incorporating the overseas production order into the production plan, a process similar to one shown in FIG. 4 may be executed. However, at the time when the domestic part of the production orders is incorporated into the production plan, the achievement ratio of all equalizing factors to the ideal number of products is not necessarily just 100%, but may be over or under 100%.

If the process of FIG. 4 for incorporating the overseas part of production orders into the production plan is performed, calculation of the ideal number of products for each equalizing factor in step S201 reflects the increasing or decreasing of the achievement ratio of the ideal number of products for each equalizing factor as the result of incorporating the domestic part of production orders into the production plan. That is, when the equalizing factor for which the achievement ratio for the domestic part of the production orders is under 100%, the ideal number of products is increased commensurately. Likewise, when the equalizing factor for which the achievement ratio for the domestic part of production orders is over 100%, the ideal number of products is decreased commensurately. As a result, each equalizing factor may, in general, be close to the ideal number of products.

Thus, after setting up the ideal number of products, the production orders stored in the overseas production order DB 17 are sequentially incorporated into the production plan, until the production number for the overseas part of the production orders for one day set up in step S101 is reached. Also, at this time, a plurality of selection conditions may be changed for selecting the production order to be incorporated into the production plan, a plurality of production plans are made, and the penalties for respective production plans are compared to select the production plan having the lowest penalty as the optimal production plan for the overseas part of production order.

In the BTO management system 10, it is possible to create the production plan for one day on the basis of the production orders actually received rather than on speculation. Thus, cars may be efficiently built to order (BTO), which was thought to be an impossibility in the past.

Moreover, it is possible to ensure that production is accomplished within the specified maximum number of held days, as the algorithm is such that the production orders for which the number of held days is the specified maximum number may be incorporated into the production plan and the remaining parts of the production plan may be filled by the production orders for which the number of held days is less than the specified maximum. Accordingly, the delivery term of cars need not be extended, thereby improving service to customers.

Also, at the time when the production orders are incorporated into the production plan, the ideal number of products for each equalizing factor is set up, and, based on the achievement ratio of the number of products for the production orders for the equalizing factor incorporated into the production plan to the ideal number of products and the sequence of the order received dates for the production orders and so on, a plurality of production plans are made and compared with each other. Consequently, even though the number of options may be very large, it is possible for a relatively simple algorithm to effectively create the production plan for cars that are complicated by various intertwined factors.

Further, when the one-day production plan is created, the production plan for the domestic part of the production orders is made first, and then the production plan for the overseas part of the production orders, which takes longer, is set up. It is therefore possible to absorb the variations of the overseas part of production orders by buffering. Accordingly, it is then possible to equalize the production plan through one day.

Although the above description shows the creation of a production plan for each day, it is also possible to create equalized production plans for each week, each hour, and the like, in a similar manner.

Also, the invention is not limited in its application to cars, as the same technique applies as well to a wide variety of other products, for example including personal computers and the like, built to order for customers.

Further, in the above descriptive embodiment, a configuration has been described for creating a production plan by combining the production plans for domestic production orders and overseas production orders. More generally, it is possible with the present invention to combine production plans for two order groups having different appointed terms of delivery, for example, one for products built to order after receiving orders from customers and the other for building according to scheduled production orders with longer appointed terms of delivery than the former.

Also, the above mentioned BTO management system 10 can be configured to perform predetermined functions with a single computer system or with a combination of multiple computer systems. In the latter case, the multiple computer systems may be interconnected through a network such as WAN or the like.

Further, it is also possible to configure a BTO system including a terminal for receiving the domestic part of production orders and the overseas part of production orders, a production line control terminal for controlling the production lines based on a production plan output, and so on, and for receiving orders for products such as cars or the like, making a production plan, and actually controlling the production lines.

Also, a computer program for creating the production plan shown in the above embodiment can be in the form of a storage medium as described below. That is, the computer program as stated above which is executed by a computer system may be machine-readably stored in storage media such as CD-ROM, DVD, memory unit, hard-disk and so on.

Additionally, it is possible to choose any of the configurations described above or to modify these configurations without departing from the spirit of the invention.

For descriptive convenience, a listing of symbols follows:
- 10 . . . BTO management system (production plan creation system)
- 12 . . . rule storage section
- 13 . . . temporary storage section
- 14 . . . production plan creation section (production plan creation means)
- 16 . . . domestic production order DB (first order information storage means, database, order information storage section)
- 18 . . . overseas production order DB (second order information storage means, database, order information storage section)
- 19 . . . production plan storage section

We claim:

1. A method for creating a production plan for built-to-order products comprising:

providing a first order information storage database for storing data of a first production order information group, providing a second order information storage database for storing data of a second production order information group for which an appointed term of delivery is longer than an appointed term of delivery for the first production order information group, and storing at least one equalizing factor with order information of the first and second order information storage databases and being a factor affecting a number of processes taken in assembling each product to be produced based on options being added to each product;

identifying an equalizing factor from the equalizing factors stored in the first and second order information storage databases and estimating a number of products to be produced during a predetermined period to define an ideal number of products for each equalizing factor, and selecting production order data from an achievement ratio of the ideal numbers for each equalizing factor; and creating a plurality of production plans for a product in accordance with the production order data selected from the first and second production order information groups based on the ideal number of products for each equalizing factor and on the achievement ratio of the ideal numbers for each equalizing factor and comparing a plurality of production plans to select a production plan in accordance with a product output defined during the predetermined period;

wherein identifying an equalizing factor from the equalizing factors includes recalculating the achievement ratio for each equalizing factor and if the achievement ratios for all of the equalizing factors have not reached 100%, achievement ratio calculation is repeated until the achievement ratios for all of the equalizing factors reach 100%.

\* \* \* \* \*